No. 607,417. Patented July 19, 1898.
J. M. BAILEY.
PROCESS OF AND APPARATUS FOR TREATING CRUDE OIL IN MANUFACTURING GAS AND LUBRICATING OIL.
(Application filed Apr. 21, 1896.)
(No Model.)
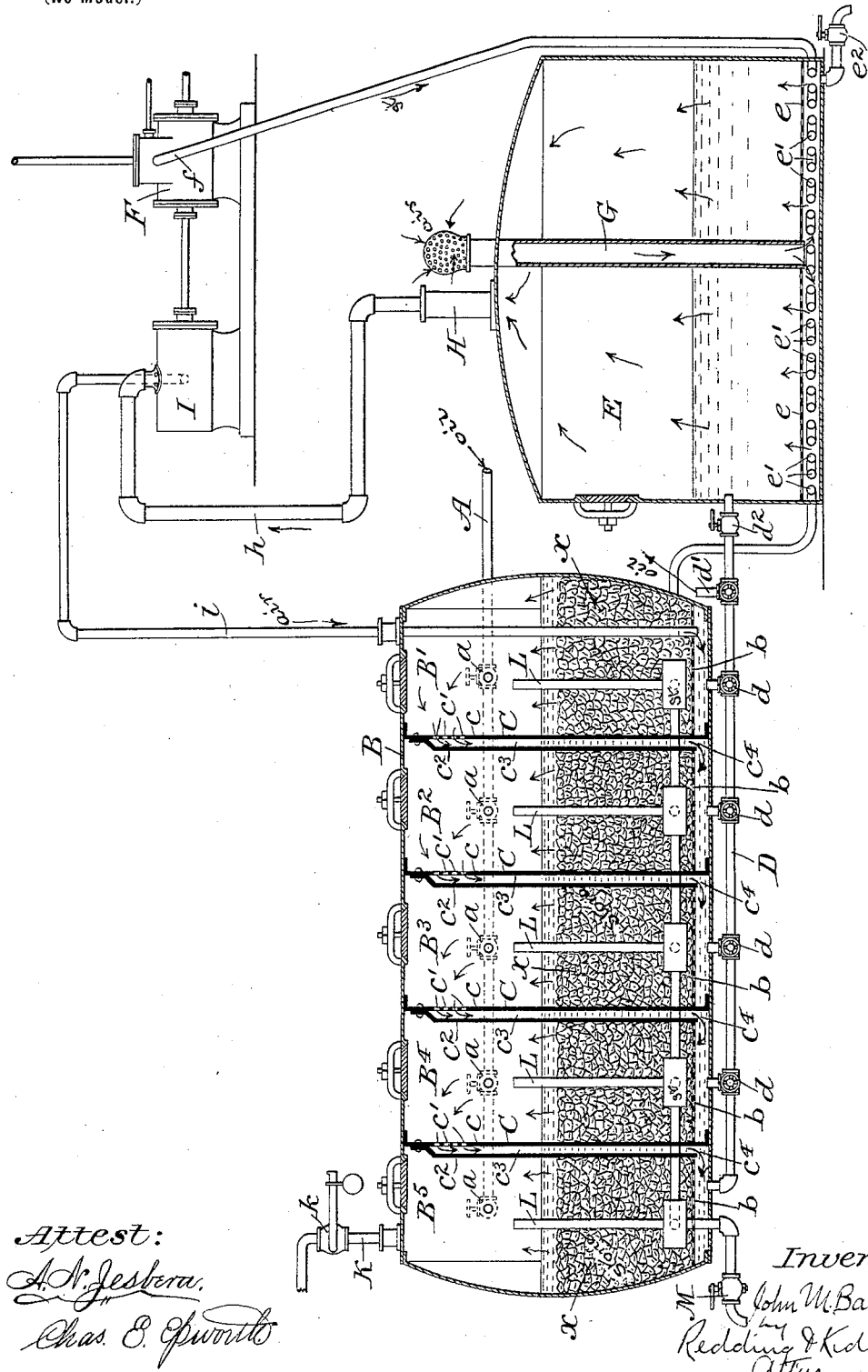
Attest:
A. N. Jesbera
Chas. E. Spurritt
Inventor:
John M. Bailey
by Redding & Kiddle
Attys

UNITED STATES PATENT OFFICE.

JOHN MASON BAILEY, OF BOSTON, MASSACHUSETTS.

PROCESS OF AND APPARATUS FOR TREATING CRUDE OIL IN MANUFACTURING GAS AND LUBRICATING-OIL.

SPECIFICATION forming part of Letters Patent No. 607,417, dated July 19, 1898.

Application filed April 21, 1896. Serial No. 588,493. (No model.)

*To all whom it may concern:*

Be it known that I, JOHN MASON BAILEY, a citizen of the United States, residing in the city of Boston, county of Suffolk, State of Massachusetts, have invented certain new and useful Improvements in Processes of and Apparatus for Treating Crude Oil in the Manufacture of Gas and Lubricating-Oil, of which the following is a specification, reference being had to the accompanying drawing, forming a part thereof.

In Letters Patent of the United States No. 478,549, which were granted to me July 12, 1892, I have shown and described an apparatus for the production of fuel-gas from crude petroleum-oil. The practical use of such apparatus has shown it to be efficient for the purpose referred to, and it has also suggested certain modifications both in the apparatus itself and in the process or method of manufacture carried on in it, with the result that not only is the manufacture of fuel-gas facilitated and cheapened, but a superior illuminating-gas is cheaply produced, the maximum quantity of gas being produced from a given quantity of oil, and the residuum of the oil which has heretofore been a waste product of the process on account of its low specific gravity is so far increased in specific gravity as to become valuable as a lubricant. In the production of illuminating-gas by this process and by use of this apparatus I have found that hydrogen gas produced by the decomposition of water is preferable to air as a vehicle, its capacity for taking up and holding permanently in suspension the light hydrocarbons of crude petroleum-oil being much greater than that of air. In fact, in improving the apparatus and the process it has been my special purpose, besides producing a gas adapted to illuminating as well as fuel purposes, to give a value to the former waste product, and thereby to largely increase the economic and commercial value of the process. Accordingly, by my present invention, after the process has been conducted for a time sufficient to accumulate a quantity of oil which does not readily give off its volatile elements to the air or hydrogen gas or other gaseous vehicle forced through it and is yet of too low specific gravity to be valuable as a lubricant, I thereafter heat this residuum to a higher temperature than before and draw through it the fresh air or hydrogen gas on its way to the tanks or vats, in which it is to be forced through the fresh oil. In this way I make use of air or hydrogen gas which is in the most favorable condition to absorb, take up, or mix with volatile elements for the purpose of acting upon the hydrocarbon oil when it is in the least favorable condition for giving up such volatile elements as may remain in it. The result is that the residual hydrocarbon which is finally produced has a specific gravity in the neighborhood of 30° Baumé.

My invention consists in the modified and improved process which I have referred to and which will be more particularly described hereinafter and in the apparatus in which the process may be carried out.

The accompanying drawing presents a view, partly in section and partly in elevation, of one convenient form in which my invention may be embodied.

The fresh oil may be supplied through a pipe A to a tank or vessel B, in which air or hydrogen gas or other gaseous vehicle is drawn through the oil under a partial vacuum and is finally saturated to such a degree or is so intimately mingled or emulsified with the volatile portions of the oil that it becomes a stable and permanent gaseous fluid which is highly combustible and illuminative. The function of this tank is in general the same as that of the corresponding tank shown in my said Letters Patent; but I have improved the internal arrangement and construction of the tank in order to facilitate the process which is carried on therein. To this end I have divided the tank into a series of compartments $B'$ $B^2$ $B^3$ $B^4$ $B^5$ by a series of what may be called "compound" diaphragms C C—that is to say, each one consists of a plate $c$, which forms a tight wall across the tank and is perforated, as at $c'$, above the line of oil in the tank, and of a second plate $c^2$, which is secured tightly to the plate $c$ with a space between, as at $c^3$, and extends across the tank from side to side and nearly but not quite across from top to bottom, leaving a space $c^4$ at the bottom. A channel is thus formed which extends across the tank from side to side through which the air or gas may pass from the top of one compartment to the next below the surface of the oil therein and is distributed over a wide space at the bottom of such next tank, while at the same time the main tank is braced and strengthened by the double partition, this being a desideratum in view of the large size of the tank employed. Each compartment is preferably connected to the supply A by a three-way or other suitable valve $a$, as indicated in dotted lines. Likewise each compartment may be connected by a three-way or other suitable valve $d$ to a common pipe D, by means of which the oil in each compartment, after it has been reduced as far as may be considered desirable, may be drawn off and transferred to the next tank or compartment. Preferably the pipe D has a connection, as at $d'$, to a pump, (not shown,) which is again connected to the supply-pipe A, whereby the oil may be transferred from one compartment to another after the valves $a$ and $d$ have been properly adjusted. The pipe D is also connected, preferably through a cock $d^2$, with a tank E, into which the oil may be delivered from the compartment B' or from any other after it has been raised to such a specific gravity that it does not readily give off its volatile elements at the temperature at which the process is mainly conducted. The tank E is preferably provided near its bottom with a grating $e$, and beneath the grating is placed a series of pipes $e'$ $e'$, into which the steam is conducted directly from the boiler or from the exhaust $f$ of the steam-cylinder F. The tank E is tightly closed except for a supply-pipe G, which is open above the tank to receive fresh air, as shown, or is connected with a vessel or holder (not shown) containing hydrogen gas and is open near the bottom of the tank, preferably beneath the grating $e$, and except for the delivery-pipe H, which is connected to the suction-pipe $h$ of the air-pump I. In this manner instead of supplying the air-pump directly from the atmosphere the fresh air or hydrogen gas or other gaseous vehicle while in its most highly absorptive condition is first drawn under a partial vacuum through the oil in the tank E, which is nearly exhausted of its volatile elements, and not only is the oil in that tank, by reason of the fact that the air or gas is fresh and of the further fact that the oil much more readily gives up its volatile elements under the partial vacuum than under pressure, thereby made to give up more completely its volatile elements, but its specific gravity is raised to such a degree that it is no longer a waste product, but has a value as a lubricant as it is drawn from the cock $e^2$. From the pump I the air or hydrogen gas is passed through the pipe $i$ into the bottom of the first compartment B' and through the oil therein, and thence in succession through the several compartments, and finally passes from the last compartment through the pipe K, which may be provided with a suitable blow-off or relief-valve $k$.

As stated above, the steam from the boiler or from the steam-cylinder passes first through the coils in the tank E. Thence it passes in succession through the heaters L, arranged in the several compartments, whereby as the oil gives up its volatile elements, being placed first in the one compartment and transferred to the other compartments in succession after treatment, it is successively heated to higher temperatures and thereby made to yield its volatile elements in the condition necessary for their absorption by or combination with the air or hydrogen gas or other gaseous vehicle which is passed through the compartments. Provision is made for drawing off the water of condensation through the cock M.

It is to be observed that the compartment into which the oil is first introduced is heated to the lowest temperature not only because the air or gas which enters that compartment is then more absorptive, but because the fresh oil, if then heated to a high temperature, would too readily give off light hydrocarbons, which would pass off with the gaseous vehicle in the form of a condensible vapor.

It is desirable that the compartments be partly filled with broken stone or other analogous granular non-absorbent material, as indicated at $x x$, which may rest upon the grated floors $b$ $b$, the function of such material being to prevent the coalescing of the minute bubbles or globules of the gaseous vehicle and to insure the contact of each particle of the gaseous vehicle with the oil.

Inasmuch as the general principle involved in this invention is the same as that disclosed in my aforesaid Letters Patent, I have not deemed it necessary herein to explain the same in detail; but it will be perceived readily that I have further developed the application of that principle, with the result that I have greatly increased the commercial value of the invention.

I claim as my invention—

1. The herein-described process of treating crude oil for the manufacture of gas and lubricating-oil which consists in forcing a gaseous vehicle through the oil until it ceases to give off its volatile elements readily, then drawing off the residual oil and continuing the process by drawing a fresh supply of the gaseous vehicle first through the residual oil under a partial vacuum and then forcing it through the crude oil, substantially as described.

2. The herein-described process of treating crude oil for the manufacture of gas and lubricating-oil which consists in forcing a gaseous vehicle through the oil until it ceases to give off its volatile elements readily, in then drawing off the residual oil and continuing the process by drawing the gaseous vehicle first through the residual oil under a partial vacuum and then forcing it through the crude oil, and in heating the oil to successively higher temperatures as it gives off its volatile elements, substantially as described.

3. The combination of a closed tank adapted to receive oil to be treated, a pump adapted to deliver a gaseous vehicle below the surface of the oil in said tank, a second closed tank adapted to receive the oil from the first tank, a supply-pipe adapted to deliver the gaseous vehicle beneath the surface of the oil in said second tank, and a pipe connecting the suction side of said pump to the top of said second tank whereby the gaseous vehicle is drawn through the oil in the second tank under a partial vacuum, substantially as described.

This specification signed and witnessed this 18th day of April, A. D. 1896.

JOHN MASON BAILEY.

In presence of—
CHAS. HALL ADAMS,
ARTHUR R. TORREY.